United States Patent
Moreno et al.

(10) Patent No.: US 6,456,063 B1
(45) Date of Patent: Sep. 24, 2002

(54) SELF COMPENSATING CONTROL CIRCUIT FOR DIGITAL MAGNETIC SENSORS

(75) Inventors: Daniel J. Moreno; Yingjie Lin, both of El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 09/706,199

(22) Filed: Nov. 3, 2000

(51) Int. Cl.[7] .................. G01R 33/025; G01B 7/30
(52) U.S. Cl. .................. 324/207.12; 324/207.21; 324/207.25; 324/167; 324/173; 324/174
(58) Field of Search .................. 324/169, 173, 324/174, 167, 207.12, 207.21, 207.2, 207.25; 123/617

(56) References Cited

U.S. PATENT DOCUMENTS

| | | | |
|---|---|---|---|
| 4,635,142 A | 1/1987 | Haugland | 360/46 |
| 4,782,692 A | 11/1988 | Peden et al. | 73/117.3 |
| 4,843,580 A | 6/1989 | Ridoux et al. | 364/569 |
| 4,885,710 A | 12/1989 | Hersberger et al. | 364/565 |
| 4,914,387 A | 4/1990 | Santos | 324/166 |
| 4,926,122 A | 5/1990 | Schroeder et al. | 324/207.13 |
| 4,962,470 A | 10/1990 | Hansen | 364/572 |
| 5,070,727 A | 12/1991 | Davis et al. | 73/116 |
| 5,079,945 A | 1/1992 | Hansen et al. | 73/116 |
| 5,119,670 A | 6/1992 | Whitehorn et al. | 73/116 |
| 5,144,233 A | 9/1992 | Christenson et al. | 324/207.25 |
| 5,196,793 A | 3/1993 | Good et al. | 324/207.25 |
| 5,216,405 A | 6/1993 | Schroeder et al. | 338/32 R |
| 5,218,298 A | 6/1993 | Vig | 324/251 |
| 5,389,889 A | 2/1995 | Towne et al. | 330/6 |
| 5,404,304 A | 4/1995 | Wise et al. | 364/426.04 |
| 5,406,485 A | 4/1995 | Wise et al. | 364/426.02 |
| 5,418,453 A | 5/1995 | Wise | 324/160 |
| 5,450,008 A | 9/1995 | Good et al. | 324/166 |
| 5,459,398 A | 10/1995 | Hansen et al. | 324/166 |
| 5,477,142 A | 12/1995 | Good et al. | 324/166 |
| 5,510,706 A | 4/1996 | Good | 324/166 |
| 5,554,948 A | 9/1996 | Hansen et al. | 327/181 |
| 5,568,048 A | 10/1996 | Schroeder et al. | 324/207.21 |
| 5,570,016 A | 10/1996 | Schroeder et al. | 324/207.25 |
| 5,617,489 A | 4/1997 | Adachi | 382/275 |
| 5,650,719 A | 7/1997 | Moody et al. | 324/166 |
| 5,719,496 A | 2/1998 | Wolf | 324/165 |
| 5,731,702 A | 3/1998 | Schroeder et al. | 324/207.21 |
| 5,754,042 A | 5/1998 | Schroeder et al. | 324/207.25 |
| 5,883,564 A | 3/1999 | Partin | 338/32 R |
| 5,916,459 A | 6/1999 | Schroeder et al. | 219/121.06 |
| 5,917,320 A | 6/1999 | Scheller et al. | 324/166 |
| 6,147,486 A * | 11/2000 | Koss et al. | 324/166 |
| 6,211,670 B1 * | 4/2001 | DeWilde et al. | 324/207.21 |
| 6,252,395 B1 * | 6/2001 | Aoyama et al. | 324/207.12 |

FOREIGN PATENT DOCUMENTS

| | | | | |
|---|---|---|---|---|
| DE | 42 05 352 C2 | * | 5/1994 | H03K/5/00 |
| EP | 0 366 619 B1 | * | 9/1995 | G01R/19/175 |
| JP | 401143916 A | * | 6/1989 | G01D/5/245 |

* cited by examiner

Primary Examiner—Edward Lefkowitz
Assistant Examiner—Darrell Kinder
(74) Attorney, Agent, or Firm—Margaret A. Dobrowitsky

(57) ABSTRACT

A self-compensating control circuit for use with a magneto-resistive sensor. The control circuit includes a first stage amplification and offset function that removes a DC component from the input signal and maximizes an AC component of the input signal within the dynamic range of the control circuit. Subsequent stages remove the remaining DC component, if any, and provide suitable additional amplification. A comparator provides a digital output based on the processed input signal and a threshold signal.

8 Claims, 4 Drawing Sheets

SELF COMPENSATING CONTROL CIRCUIT FOR DIGITAL MAGNETIC SENSORS

BACKGROUND OF THE INVENTION

1. Technical Field

This invention pertains generally to magneto-resistive (MR) based sensor assemblies, and more particularly, to a control circuit for use therewith configured to generate an output signal indicative of an angular position of a rotating member.

2. Description of the Related Art

Digital magnetic position sensors are devices that are significant to many industries, including the automotive industry. Such devices are used to sense an angular position of a shaft, such as a crankshaft or a camshaft of an engine. Information on the shaft position may then be used for fuel and ignition timing, and the like. In one application a very high degree of angular accuracy and repeatability is required to detect small variations in crankshaft rotations, for example, less than 0.050 degrees, for misfire detection. Methods are known for making such determinations, such as set forth in U.S. Pat. No. 5,754,042 entitled "MAGNETORESISTIVE ENCODER FOR TRACKING THE ANGULAR POSITION OF A ROTATING FERROMAGNETIC TARGET WHEEL" issued to Schroeder et al.

Schroeder et al. disclose an apparatus for detecting angular positions of a rotating object (e.g., shaft). The apparatus includes a magnet, and two magneto-resistive (MR) sensors positioned between the magnet and a target wheel that is attached to the rotating object. The target wheel (both single-track and dual-track embodiments are disclosed) has a plurality of teeth separated by slots angularly spaced around the periphery. Constant current sources electrically bias the two MR sensors. When the target wheel rotates, the resistance of each MR sensor changes due to varying magnetic fields to which the MRs are exposed. The varying resistance is operative to generate an analog voltage signal that transitions between two voltage levels at the passage of the leading and trailing edges of the teeth. The two sensor signals are processed to output a digital signal having state transitions corresponding to the tooth edges. Implementing the system disclosed in Schroeder et al., however, presents certain challenges.

The accuracy of the detector of Schroeder et al. depends, to some degree, on using accurately matched MR sensors. The MR sensors have an inherent tendency for a mismatch in their resistance characteristics due to a number of factors. The mismatch leads to analog signals that vary in such a way that the accuracy (i.e., the degree to which digital output edges correspond to tooth/slot features) is affected. One factor involves variations in the manufacturing process of the MR sensors. Another factor involves subtle differences in a magnetic bias field to which the MRs are exposed. The differences in the magnetic bias field result from a variety of factors, including fluctuations in an air-gap (i.e., a distance between the MR sensor and the peripheral surface of a target wheel tooth), and imperfections in the target wheel, and bias magnet themselves. Yet another factor involves temperature. In particular, the resistance profile of an MR sensor can vary greatly over a temperature range encountered in the automotive environment, For example, −40° C. to +180° C. Worse yet, the variation in the resistance profile differs from MR sensor to MR sensor. Other factors leading to mismatch include stress and aging. In all, the analog voltage signal produced by the MR sensors have variations in its amplitude, shape and DC offset voltage that are induced by external factors that cannot be controlled or are difficult and/or costly to control.

One general approach taken in the art to deal with signal variability due to mismatch purports to improve the matching of the MR sensors. For example, one particular approach taken in the art involves pretesting multiple MR sensors to enable selection of sensors that are closely matched. However, this approach increases cost, is relatively time consuming and in any event is difficult to achieve desired levels of match over the wide temperature range encountered. A related approach is disclosed in U.S. Pat. No. 5,916,459, issued to Schroeder et al., entitled "METHOD OF MATCHING MAGNETORESISTORS IN A SENSOR ASSEMBLY," which involves use of a laser to reduce the magnetic field portion of a permanent magnet underlying the sensor with a higher electrical resistance. This particular approach may also increases cost and time.

Another general approach taken in the art to deal with signal variability due to mismatch does not involve trying to improve the sensor match but rather involves the downstream signal processing. For example, one particular approach involves the use of an adaptive threshold, as seen by reference to U.S. Pat. No. 5,917,320 issued to Scheller et al. entitled "DETECTION OF PASSING MAGNETIC ARTICLES WHILE PERIODICALLY ADAPTING DETECTION THRESHOLD". Scheller et al. detects a peak-to-peak level of an input sensor signal, and then produces a threshold signal that is a percentage of the peak-to-peak level. A digital output signal is generated by comparing the threshold signal and the input sensor signal. However, a broad applicability of Scheller et al. is limited inasmuch as the processing circuits assume a relatively large and stable input signal. In particular, Scheller et al., does not disclose the use of one/two MR sensors, but rather discloses in one embodiment the use of a MR sensor bridge as a magnetic field-to-voltage converter. It is known that a MR sensor bridge minimizes many variabilities in the output, especially as to temperature. However, such a bridge requires four (4) MR sensors, which is prohibitively expensive in many applications.

Moreover, simple AC coupling (e.g., series connected capacitor to filter DC) has two problems. First, it introduces a phase error, which is unacceptable when trying to align edges of the digital output signal with the corresponding edges of the teeth/slot features. Second, it does not perform at low frequencies (e.g., <20 HZ), as contemplated in automotive applications.

There is therefore a need for a control circuit for an MR sensor based assembly that minimizes or eliminates one or more shortcomings as set forth above.

SUMMARY OF THE INVENTION

One advantage of the present invention is that it provides, in one embodiment, accurate angular position indications using only one magneto-resistive (MR) magnetic field sensor, thereby providing a reduced-cost product. As a result, the relatively costly and time consuming MR sensor matching approaches need not be employed. For improved temperature compensation, a two-sensor embodiment, which also provides accurate detection, is provided.

In accordance with the present invention, an apparatus is provided for generating an output signal indicative of an angular position of a rotating member. The apparatus includes a target wheel having a plurality of teeth separated by slots angularly spaced around a periphery thereof. The target wheel is configured to be mounted to the rotating object for rotation therewith. The apparatus further includes a sense assembly having a magnetic field biasing device such as a magnet, and a magneto-resistive (MR) magnetic field sensor disposed between the magnet and the target wheel. The apparatus also includes a control circuit coupled to the MR sensor and configured to generate the output signal, which has transitions between first and second states at the passage of each leading and trailing edge of the teeth of the target wheel. The control circuit also includes an arrangement for electrically biasing the MR sensor so as to produce an input voltage signal for further processing. The input signal has a direct-current (DC) component and an alternating-current (AC) component superimposed thereon when the target wheel rotates. In accordance with the present invention, the control circuit further includes a first amplifier circuit configured to substantially remove the DC component from the input signal and to amplify the input signal by a predetermined factor selected to maximize the AC component within a dynamic range of the control circuit. Through the foregoing, a relatively small AC component input is positioned and amplified within the dynamic range of the control circuit, which simplifies and optimizes generation of a threshold signal used in generating the output signal.

In a preferred embodiment, the control circuit further includes a peak detector circuit responsive to the output of the first amplifier circuit (i.e., a first signal) for generating a second signal representative of a maximum voltage level of the first signal. A second amplifier circuit, responsive to the first signal and the second signal, is configured to generate a third signal having any remaining DC component substantially removed. A reference threshold generator produces a reference threshold signal corresponding to a predetermined percentage of a peak level of the third signal. A Comparator is provided to generate the final output signal by comparing the reference threshold signal and the third signal. The reference threshold signal establishes the transition level for the output signal that will correspond to the true position of the tooth edges on the target wheel. Accurate and repeatable detection of the edges is desirable for many applications, including crankshaft and camshaft position determination.

Other features, objects, and advantages will become apparent to one of ordinary skill from the following detailed description and drawings illustrating the invention by way of example, but not by way of limitation.

DETAILED DESCRIPTION OF THE PREFERRED EMBODIMENTS

Figures 1A, 1B:
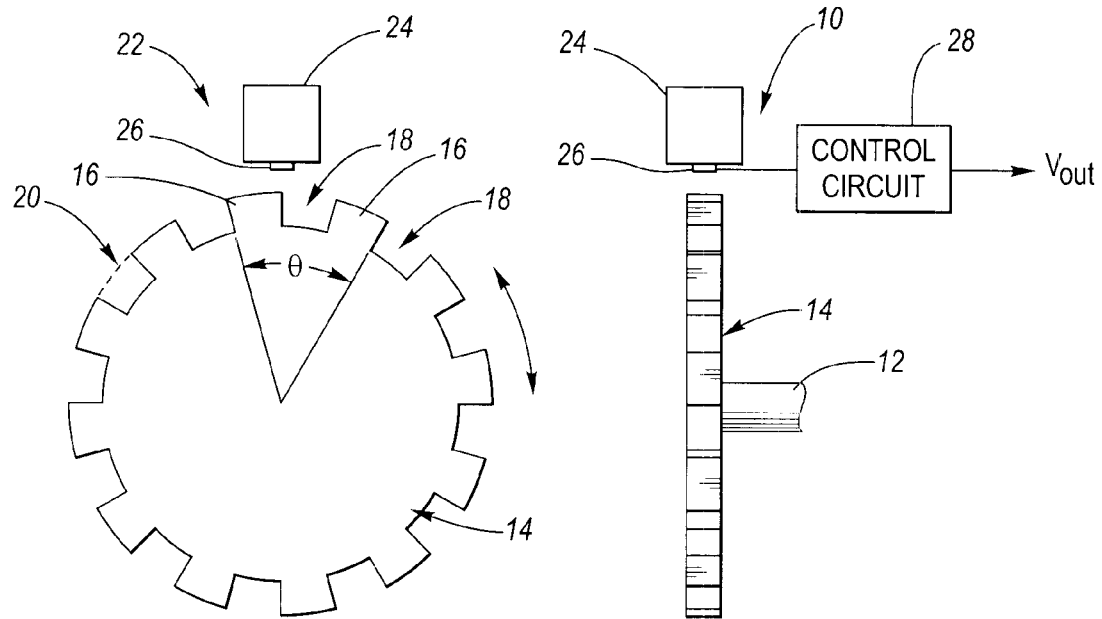
FIGS. 1A–1B are simplified diagrammatic front and side views, respectively, of an apparatus for generating a digital output signal in accordance with the present invention.

Referring now to the drawings wherein like reference numerals are used to identify identical components in the various views, FIGS. 1A–1B are front and side views, respectively, of an apparatus 10 for generating an output signal $V_{out}$ indicative of an angular position of a rotating member, such as a crankshaft 12, a camshaft (not shown), or the like. It should be understood that the present invention may be used in connection with detecting the angular position of other rotating members, other than crankshafts, camshafts, or the like.

In the illustrated embodiment, apparatus 10 includes a ferrous target wheel 14 having a plurality of teeth 16 separated by slots 18 angularly spaced around a periphery 20 thereof, a sense assembly 22 having a magnetic field biasing device such as a magnet 24 and a magneto-resistive (MR) magnetic field sensor 26, and a control circuit 28 configured to generate the output signal $V_{out}$. The output signal $V_{out}$, in a preferred embodiment, transitions between a first state 30 (e.g., a logic low-FIG. 3D) and a second state 32 (e.g., a logic high-FIG. 3D) at the passage thereby of each leading and trailing edge of teeth 16.

Before proceeding to a detailed description of the preferred embodiments, a general overview of the inventive processing established by apparatus 10 will be set forth. Apparatus 10 employs an adaptive threshold approach to derive a threshold signal $V_{TH}$ from an input signal $V_{in}$ that is produced using MR sensor 26. The threshold signal $V_{TH}$ will be positioned to intersect a modified sensor input signal at a predetermined percentage of a peak-to-peak voltage level thereof. Control circuit 28 is configured to compare the two signals and generate a square wave output $V_{out}$ that switches at the points of intersection.

The principles of the present invention will be described in connection with a magneto-resistive (MR) sensor, in preferred embodiments, in that such a sensor has a relatively good sensitivity to magnetic fields, although, as described in the Background, a significant sensitivity to temperature. It should be understood that other sensor types, such as hall sensors, may be used in substitution thereof. One aspect of the present invention involves maximizing the amplitude of the input signal $V_{in}$ prior to performing the adaptive threshold function to derive the reference threshold level $V_{TH}$. In another aspect, since the sensor input signal $V_{in}$ may have a significant and unknown DC offset, such amplification may require, in certain circumstances, an adaptive offset adjust function in order to position the amplified sensor input signal $V_{in}$ within a dynamic range of control circuit 28 (i.e., in one embodiment, 0 to 5 volts). The adaptive threshold function is simplified by positioning the amplified sensor input signal in a AII controlled region within control circuits 28's dynamic range. Amplifying the sensor input signal $V_{in}$ improves the positioning accuracy of the threshold signal $V_{TH}$ relative to the sensor input signal $V_{in}$ and also provides a sharper cross-over point between the two signals that improves the switch point accuracy and repeatability of the square wave output signal $V_{out}$. These improvements in accuracy and repeatability provide more robust solutions to angular position sensor applications with accurate detection of slot features to higher air-gaps and with output signal stability that vary less than a few microseconds. This level of repeatability is indispensable in order to monitor small variations in crankshaft rotations, for example, less than 0.050 degrees, for misfire detection.

With continued reference to FIGS. 1A–1B, target wheel 14 may comprise a conventional single-track target wheel formed principally of ferrous material or other magnetically-permeable material. Target wheel 14, in all other respects, may comprise a conventional target wheel known in the art.

Sense assembly 22, as shown, includes MR sensor 26 disposed between magnet 24 and target wheel 14. Magnet 24 may be a permanent magnetic, known to those of ordinary skill in the art for such applications as described herein. MR sensor 26 may be an InSb MR transducer. Similar MR sensors are known in the art, such as described in U.S. Pat. No. 5,883,564 entitled "MAGNETIC FIELD SENSOR HAVING HIGH MOBILITY THIN INDIUM ANTIMONIDE ACTIVE LAYER ON THIN ALLUMINUM INDIUM ANTIMONIDE BUFFER LAYER". MR sensors, such as MR sensor 26, are useful inasmuch as a resistance value that the sensor presents to an external circuit, such as control circuit 28, changes as a function of a magnetic field to which it is exposed. As target wheel 14 rotates, alternating tooth 16 and slot 18 features rotate past MR sensor 26, effectively changing the magnetic field subjected to MR sensor 26. In a constructed embodiment, an air-gap between MR sensor 26 and a peripheral surface of tooth 16 may range between 0.20 mm and 3.00 mm, including mounting variations, target wheel diameter variations, and run-out, and sensor length variations.

MR sensor 26 exhibits a relatively large change in resistance based on changes in temperature. For example, over the range of expected temperature variation in an automotive application (−40°–180° C.), a resistance value for MR sensor 26 may range between 1.0 kohm and 2.0 kohm (this range is between an open magnetic field and with a ferromagnetic plate within 0.20 mm of the MR sensor). Changes in the free-space resistance value affects a DC offset component. The change in resistance of MR sensor 26 due to changes in magnetic field due to, for example, tooth-slot changes, may range between 25–350 ohms. Changes due to variations in the magnetic field modulate the AC component of the input signal. It should be appreciated that the change in resistance due to temperature is much larger than the change in resistance due to changes in magnetic field. Since it is the AC component that contains the desired information regarding angular position, it should be understood that certain challenges are presented which are solved by control circuit 28 that accurately extract this information.

Figure 2:
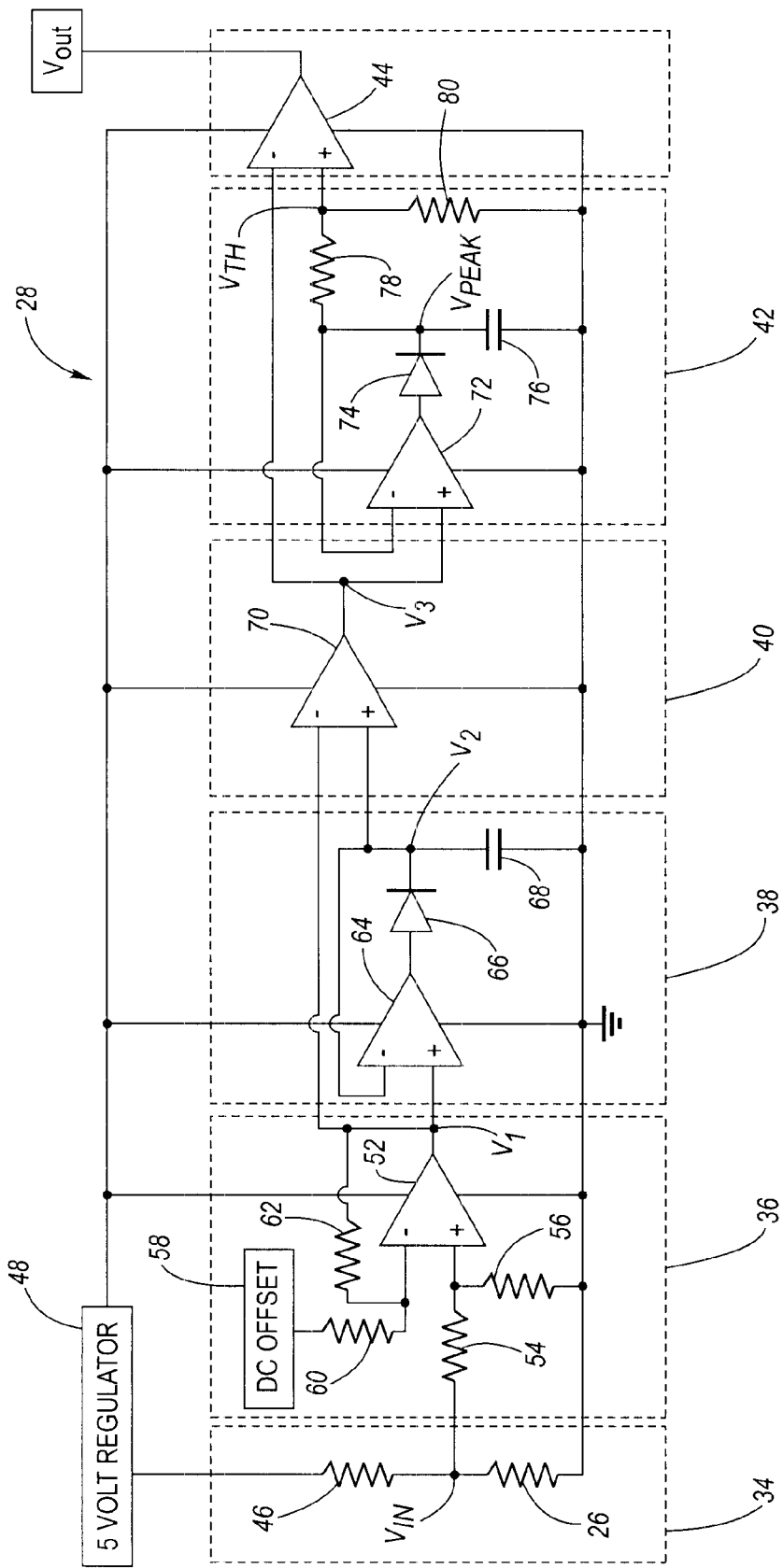
FIG. 2 is a simplified schematic and block diagram view showing in greater detail a control circuit portion of the apparatus shown in FIG. 1B.

FIG. 2 is a schematic and block diagram view showing, in greater detail, control circuit 28 in FIG. 1B. Control circuit 28 is operatively coupled to sense assembly 22 and is configured to produce a digital output signal $V_{out}$ indicative of an angular position of rotating target wheel 14. Control circuit 28 includes an electrical biasing arrangement 34, a first amplifier circuit 36, a peak detector circuit 38, a second amplifier circuit 40, a threshold reference generator 42, and a comparator circuit 44.

Arrangement 34 is configured to electrically bias MR sensor 26 to produce input signal $V_{in}$ that has a DC component 50 (best shown in FIG. 3A) and an AC component superimposed thereon when target wheel 14 rotates. Arrangement 34 includes a reference resistor 46 that is coupled to a voltage regulator 48. Note that the resistance presented by MR sensor 26 is modeled as a resistor 26 in FIG. 2. In the illustrated embodiment, reference resistor 46 and MR sensor 26 are connected in-series to form a voltage divider having a common node, on which is developed the input signal $V_{in}$. The value of the reference resistor 46 is selected based on the particular resistive characteristics of MR sensor 26. In a constructed embodiment, for a MR sensor 26 ranging between 1 kohm and 2 kohm (open air), reference resistor 46 has a fixed value of approximately 1.0 kohm. Regulator 48 may be a five volt power source. Other arrangements, such as using a constant current source to drive current through MR sensor 26 may also be used.

Figure 3A:
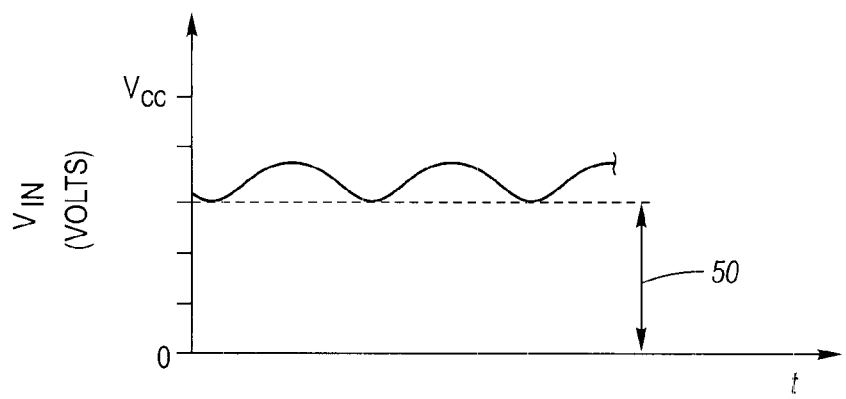
FIGS. 3A–3D are simplified timing diagram views showing a progression of the signal processing at various electrical nodes in the control circuit of FIG. 2.

FIG. 3A is a simplified view of the input signal $V_{in}$ generated by arrangement 34. From the foregoing, it should be appreciated that a DC component 50 of input signal $V_{in}$ may range between 2.50 volts and 3.33 volts, based on the voltage divider. The AC component of the input signal $V_{in}$ is generally smaller, and may be between about 70–100 millivolts, but may be as low as 30 millivolts peak-to-peak for a large air-gap, or as great as 200–250 millivolts peak-to-peak for a small air-gap. Other factors, as described in the Background, also contribute to resistance variation in MR sensor 26, such as magnetic back-bias, and part-to-part variations of all of the components. The dynamic range of control circuit 28, in the illustrated embodiment, is approximately 5.0 volts ($V_{cc}$–Gnd). The magnitude of the AC component has been exaggerated in FIG. 3A for illustration purposes.

With continued reference to FIG. 2, control circuit 28 further includes a first amplifier circuit 36 responsive to the input signal and configured to generate a first signal, designated $V_1$, as an output. First amplifier circuit 36 is configured to remove a first portion of DC component 50 from input signal $V_{in}$. Circuit 36 is further configured to amplify the input signal $V_{in}$ by a predetermined factor configured to maximize the AC component of the input signal $V_{in}$ within a dynamic range of control circuit 28. First amplifier circuit 36 defines a first stage of amplification that occurs as close as possible to the sense assembly 22, and may include noise filtering (not shown). First amplifier circuit 36 amplifies the input signal $V_{in}$ to improve the accuracy and stability of all the subsequent stages. In general, the sense assembly 22 will be operating in a known range of signals for the entire operating region, which takes into account variations in temperature, air-gap, input supply voltage signal, transducer signal frequencies, and sensor/target wheel manufacturing. This operating region, plus some acceptable safety margin, may still allow the input signal $V_{in}$ to go through some offset adjust (i.e., removal of a portion of DC component 50) and amplification without clipping the signal due to the bounds set by the dynamic voltage range of control circuit 28. First amplifier circuit 36 includes an analog amplifier 52, first and second resistors 54 and 56, a fixed DC offset voltage generator 58, and resistors 60 and 62. In a constructed embodiment, DC offset generator 58 provides a 2.5 volt DC offset. Recall that an expected DC offset range between 2.50 volts and 3.33 volts. Resistors 54, 56, 60 and 62, in a constructed embodiment, are configured to provide approximately a 6× amplification factor. The foregoing arrangement substantially removes much of the DC offset 50, while maximizing an AC component of the input signal $V_{in}$. It should be understood that other offset and gain levels may be selected for different implementations of sense assembly 22, arrangement 34, and circuit 36.

Figure 3B:
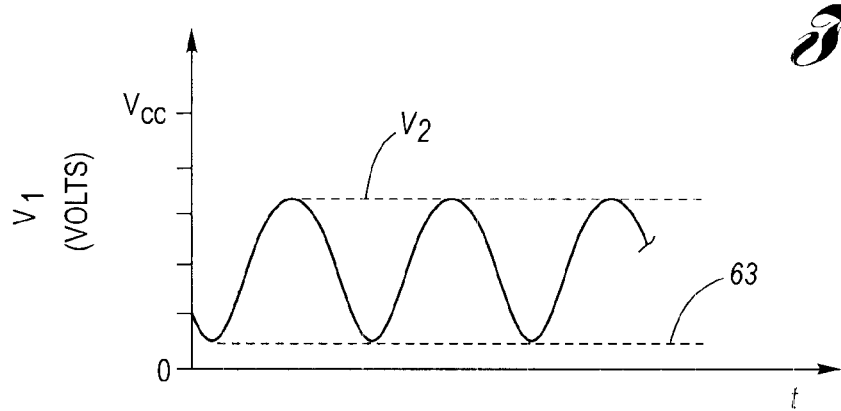

FIG. 3B shows the first signal $V_1$ generated by first amplifier circuit 36. In particular, FIG. 3B shows a residual or remainder DC component 63. Inasmuch as the DC offset may vary significantly, for example, in the illustrated embodiment, between 2.50 volts and 3.33 volts, removal of a predetermined, fixed amount, namely 2.50 volts, may, in certain circumstances, leave a remaining DC offset. FIG. 3B further shows an amplified AC component of that originally contained in the input signal $V_{in}$.

With continued reference to FIG. 2, control circuit 28 further includes a peak detector circuit 38. Peak detector circuit 38 is responsive to first signal $V_1$ for generating a second signal $V_2$ that is representative of a maximum voltage level of the first signal $V_1$. Peak detector circuit 38 detects the voltage level of the first signal $V_1$ for strategic placement and amplification within the dynamic range of control circuit 28. Other variations of circuit 38 are possible, including circuits for detecting the peak, valley, AC ground level, or even a combination of the foregoing to establish a level within the signal amplitude of the first signal $V_1$. These levels can be detected using conventional analog peak and valley detectors, by using a low pass filter to detect the AC ground level, or by converting the first signal $V_1$ to a digital signal. The digitized signal can then be processed using an algorithm to detect the peak, valley, AC ground, or any other optimized signal level to perform the offset and amplify functions that will occur in second amplifier circuit 40. The signal $V_1$ generated by first amplifier circuit 36 may have any voltage between 0 and 5 volts and an amplitude that will vary with temperature and air-gap. Therefore, an analog peak detector or valley detector is employed in accordance with the present invention to find a signal level for use in performing another offset function in second amplifier circuit 40. In the illustrated embodiment, a peak detector is used that is referenced to ground, and is charged through the output of amplifier 64 and diode 66. The illustrated peak detection scheme offers the advantage of providing a fast charge rate and a slow discharge to hold the peak level through any intervening valley features. Since a peak detector is used to generate the second signal $V_2$, the first signal $V_1$ must be subtracted from the peak signal $V_2$, therefore giving a periodic signal that is inverted (i.e., high for a slot/low for a tooth close) relative to the true tooth and slot features. In the illustrated embodiment, peak detector 38 includes an analog amplifier 64, a diode 66, and a capacitor 68. Components 64, 66 and 68 may be configured using devices known to those of ordinary skill in the art. The second signal $V_2$ is shown in FIG. 3B.

Control circuit 28 further includes a second amplifier circuit 40 that is responsive to first signal $V_1$ and the second signal $V_2$ configured to generate a third signal $V_3$ that removes substantially all of any remaining portion of DC component 50. In addition, second amplifier circuit 40 is further configured to insert additional amplification to the AC component of the incoming signal, namely, signal $V_1$. Second amplifier circuit 40 may include an analog amplifier 70. In a constructed embodiment, amplifier 70 is configured as a 3.3× amplifier. In sum, once peak detector circuit 38 detects a strategic level defined by signal $V_2$ using first signal $V_1$, second amplifier circuit performs a supplemental or second DC offset and amplification function. The effect will depend on the range of possible signal amplitudes appearing in the first signal $V_1$ and the selected DC offset level provided by DC offset block 58. Certain environmental factors that impact the input signal $V_{in}$ amplitude may limit the amount of amplifier gain employed by first amplifier circuit 36. These factors include operation air-gap range and temperature. If the AC signal amplitude included in the first signal $V_1$ is sufficiently large over all operating conditions (i.e., greater than 1.0 volts), then the offset may be performed using a unity amplifier gain. For smaller signal levels the amplifier gain should be optimized with consideration of other op-amp parameters that may impact accuracy performance such as gain-bandwidth products and slew rates that may induce a lag in generating third signal $V_3$ relative to the input signal $V_{in}$.

In a constructed embodiment, an air-gap can vary between 0.20 millimeters and 3.0 millimeters, which includes mounting variations, target wheel diameter variations and runout, and sensor length variations. MR sensor 26 provides a maximum voltage change in $V_{in}$ of approximately 250 millivolts between a tooth and slot feature at 0.20 millimeter air-gap, and minimum temperature, and with optimal processing conditions. The minimum change is approximately 30 millivolts (peak-to-peak) at 3.0 millimeter air-gap, maximum temperature, in worse-case processing conditions. Since circuit 36 amplified these signals by 6×, the signal amplitudes, at least of the AC components, from first amplifier circuit 36 can range between 0.18 and 1.50 volts peak-to-peak. Since the gain factor for second amplifier circuit 40 is limited by the maximum signal amplitude allowed by the dynamic range, the maximum gain for second amplifier circuit 40, in a constructed embodiment, was set to approximately 3.3×, accompanied by the appropriate offset adjustment so that the entire signal will fall within the 0–5 volt dynamic range.

Figure 3C:
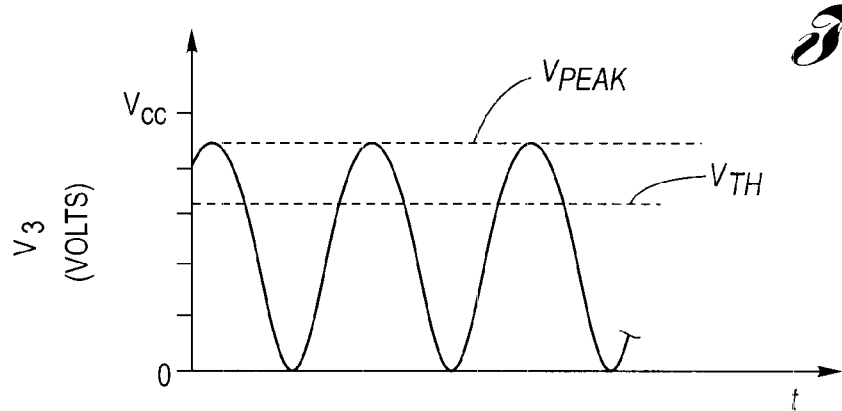

FIG. 3C shows, in graphical form, the third signal $V_3$. Note, that the phase of third signal $V_3$ is reversed relative to the first signal $V_1$. However, substantially all of the DC offset 50 in the original input signal $V_{in}$ has been removed.

With continued reference to FIG. 2, control circuit 28 further includes a threshold reference generator 42 for producing a threshold signal $V_{TH}$ that is a percentage of the peak level of the third signal $V_3$. Generator 42 is conventionally a key block of an adaptive threshold approach to angular position sensing. However, since first amplifier circuit 36, peak detector circuit 38, and second amplifier circuit 40 have optimized the AC component signal amplitude, and have positioned it within the dynamic range of control circuit 28, the resolution and accuracy requirement for this stage is not as critical as would be for conventional systems, and/or unconditioned signals (i.e., signals direct from input signal $V_{in}$). Generator 42 detects the peak levels of third signal $V_3$ to generate a reference threshold signal $V_{TH}$ that will intersect third signal $V_3$ at a strategic position within the peak-to-peak amplitude. The threshold signal $V_{TH}$ can be positioned to achieve the most accurate representation of the target wheel tooth 16 and slot 18 features, or if desired, to modify the feature size to best suit the system level detection requirements. Generator 42 includes an analog amplifier 72, a diode 74, a capacitor 76, and a pair of resistors 78, and 80.

Only the peak level needs to be detected to establish the signal peak-to-peak envelope, inasmuch as the DC component 50 has been substantially, completely removed from original input signal $V_{in}$. That is, by subtracting the first signal $V_1$ from the peak value indicated by second signal $V_2$, the third signal $V_3$ will always have a valley level of zero volts. Accordingly, an analog peak detector will detect the signal variation caused only by the variations in air-gap and temperature. By connecting resistors 78 and 80 between the peak level output $V_{peak}$ and a circuit ground, the voltage divider formed thereby will provide the threshold signal $V_{TH}$. The position of the threshold $V_{TH}$ relative to third signal $V_3$ can be tuned by optimizing the ratio of resistors 78 and 80.

FIG. 3C shows the peak level developed by the peak detection portion of circuit 42, namely components 72, 74, and 76, designated $V_{peak}$. In addition, FIG. 3C also shows the threshold signal $V_{TH}$.

With continued reference to FIG. 2, control circuit 28 further includes a comparator 44. Comparator 44 compares third signal $V_3$ to the threshold signal $V_{TH}$ and generates a digital output signal $V_{out}$ that is high when the signal applied to the non-inverting input is more positive than the signal applied to the inverting input, and vice versa. Since third signal $V_3$ is the inverse of the tooth/slot pattern on target wheel 14, the threshold signal $V_{TH}$ is preferably connected to the non-inverting terminal of comparator 44, and third signal $V_3$ connected to the inverting terminal of comparator 44 to obtain a true representation of the target wheel features. A few millivolts of hysteresis should be applied for the comparator 44 to eliminate multiple switching due to noise.

Figure 3D:
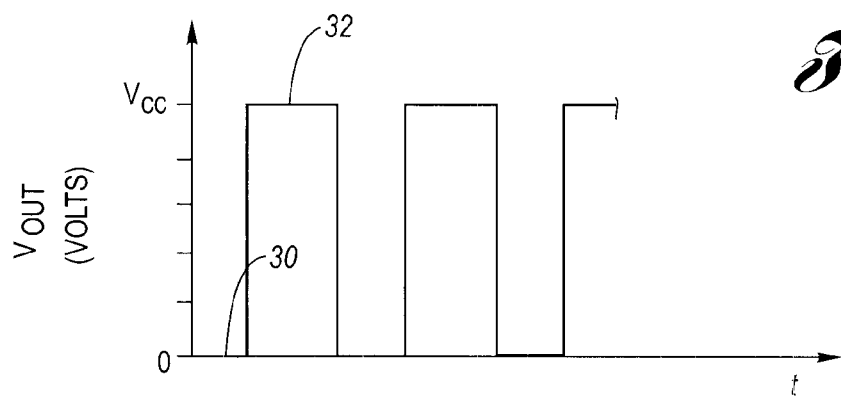

FIG. 3D shows the output of comparator 44, namely the output signal $V_{out}$. The output signal $V_{out}$ assumes a logic high state 32 corresponding to a tooth feature 16 of the target wheel, and a logic low state 30 corresponding to a slot feature 18 of the target wheel. If the inverse signal is desired, third signal $V_3$ and reference threshold signal $V_{TH}$ can be connected to the opposite terminals of comparator 44.

Figures 4A, 4B:
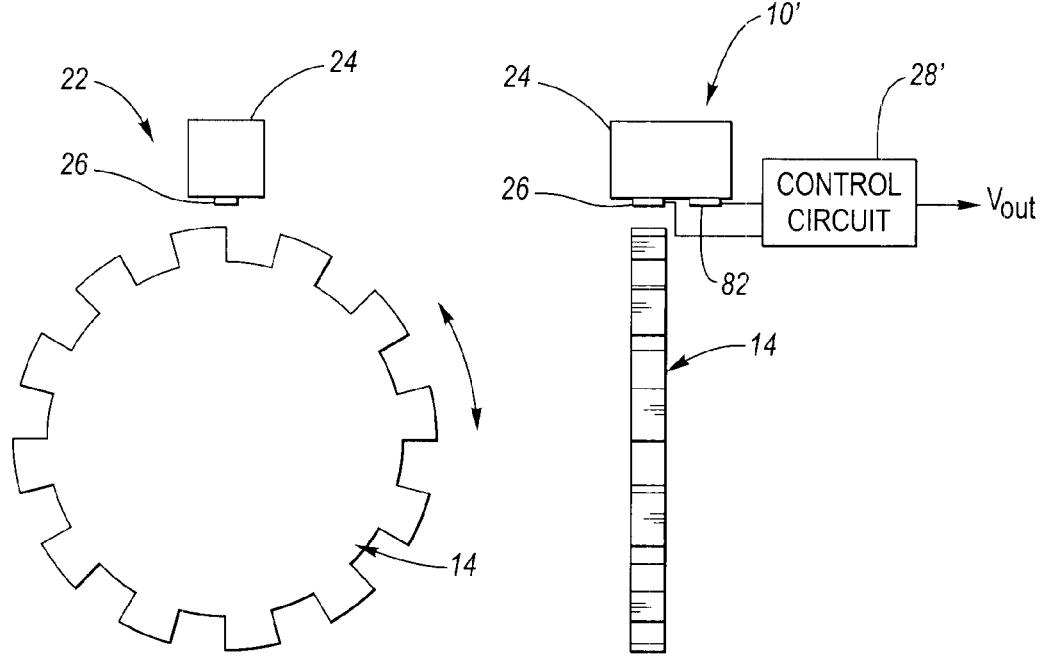
FIGS. 4A–4B are simplified diagrammatic front and side views, respectively, of an alternate embodiment of an apparatus in accordance with the present invention.

Referring now to FIGS. 4A and 4B, an alternate embodiment of apparatus 10 is illustrated, namely apparatus 10'. FIG. 4A shows a front view, and FIG. 4B shows a side view, respectively. Apparatus 10' is characterized by including a second MR sensor 82 located in a position away from target wheel 14. That is, first MR sensor 26 is positioned over a single track of target wheel 14, while the second sensor, namely MR sensor 82, is not monitoring any target wheel. The reference MR sensor 82, in a further alternate embodiment, may be included on a circuit board that includes the other components of control circuit 28 or, as in the illustrated embodiment, on the magnet assembly 24 in a position where it does not sense the target wheel 14. MR sensor 82, in apparatus 10', is employed to compensate for temperature variations. However, air-gap variations will still be present, and are compensated for in control circuit 28'. Control circuit 28' also compensates for any mismatch between MR sensors 26 and 82.

Figure 5:
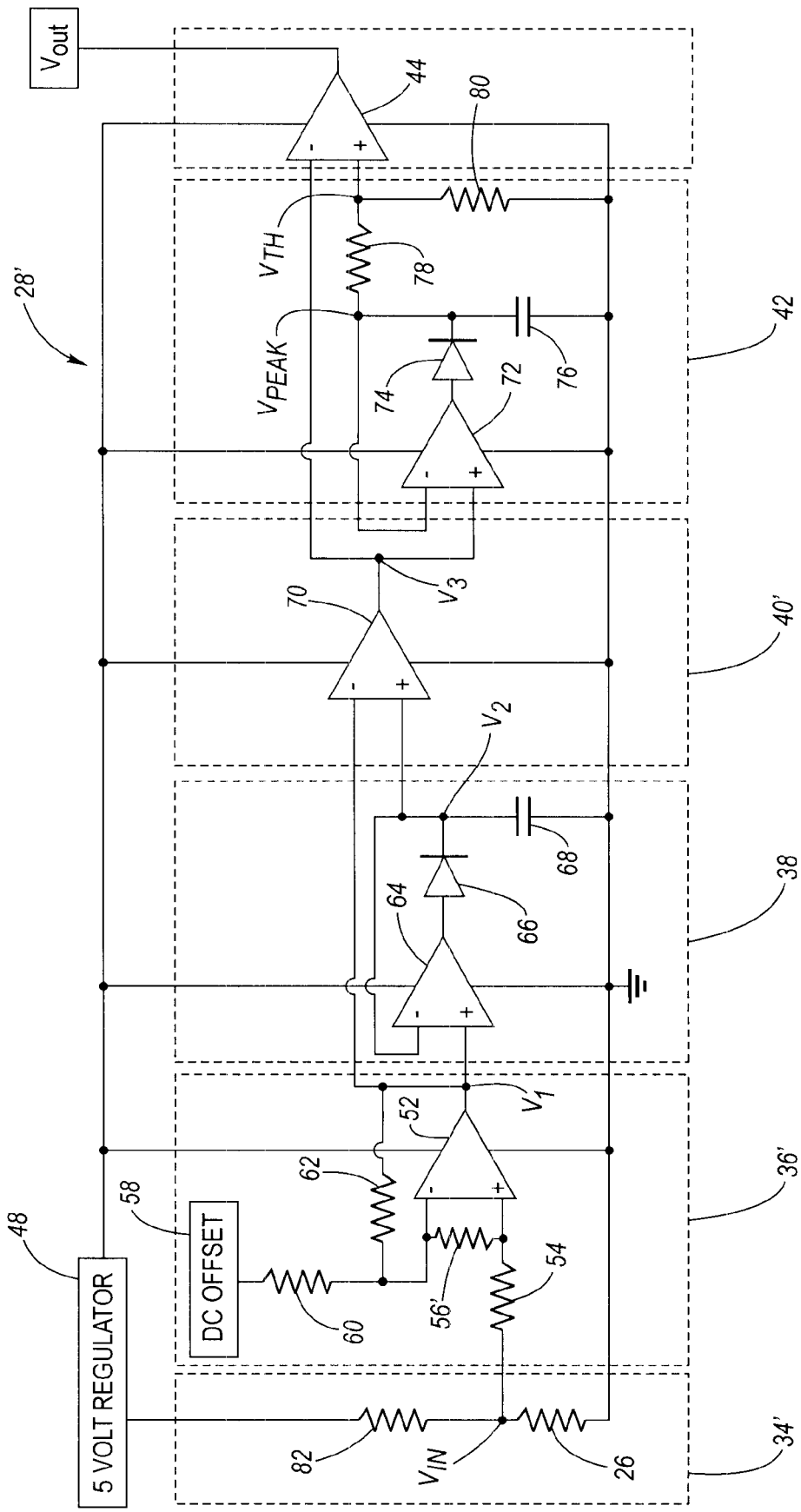
FIG. 5 is a simplified schematic and block diagram view showing in greater detail an alternate control circuit in FIG. 4B.

FIG. 5 shows control circuit 28' in greater detail. In apparatus 10', MR sensor 26 is positioned over target wheel 14 while second MR sensor 82 is on one of the circuit board or magnet assembly 24 away from the target wheel. The two MR sensors 26, 82 can be arranged in a voltage divider configuration, as shown in electrical biasing arrangement 34'. The voltage divider is connected across a regulated drive voltage from regulator 48. Alternatively, a constant current source providing a drive current $I_{DD}$ may be provided, or each MR sensor can be driven separately by independent constant current source $I_{DD1}$, and $I_{DD2}$ (i.e., a parallel configuration). The MR differential signal for any of these configurations will have a varying DC-offset for the periodic signal as a target wheel 14 spins due to differences in the magnetic bias applied to each sensor 26, 82.

With continued reference to FIG. 5, control circuit 28' further includes a first amplifier circuit 36'. First amplifier circuit 36' is substantially same as first amplifier circuit 36 except as follows. When the resistances of MR sensor 26, and MR sensor 82 are the same, $V_{in}$ will have a DC-offset of approximately 2.5 volts, and an amplitude that will vary with temperature and air-gap between about 30 and 250 millivolts peak-to-peak. The DC offset will vary from 2.5 volts by plus or minus 0.25 volts due to MR sensor mismatch between sensors 26 and 82, to thereby give a range of 2.25 to 2.75 volts. The factors include differences in resistance values, magnetic field sensitivity, temperature sensitivity, and position (especially air-gap) between sensor 26 and sensor 82. The dynamic range of apparatus 10' ranges between 0 volts and 5 volts ($V_{cc}$). Restrained only by the dynamic range, first amplifier circuit 36' can use a 2.5 volt reference for DC offset block 58, and employ a 7.7× amplification. The output signal, namely first signal $V_1$, will remain within the dynamic range of control circuit 28'.

Peak detector circuit 38 of control circuit 28' is the same as circuit 38 of control circuit 28 (FIG. 2).

Control circuit 28' further includes second amplifier circuit 40'. Circuit 40' is the same as circuit 40, except that its gain factor may also be limited by the dynamic range of control circuit 28', and accordingly, in a constructed embodiment, is set at approximately 2.5× so that the third signal $V_3$ will fall within the 0–5 volt circuit dynamic range. The gain is less than second amplifier circuit 40 because the first stage amplification, namely the amplification provided by first amplifier circuit 36' is greater than the corresponding amplification of first amplifier circuit 36 (i.e., 7.7× compared to 6×).

In all other respects, the remainder of control circuit 28' is the same as control circuit 28 shown in FIG. 2. In sum, for apparatus 10', the reference MR sensor 82 is used to compensate for temperature variations, while the control circuit 28' is configured to compensate for mismatch between transducers 26, and 82.

In accordance with the provisions, the principle and mode of operation of this invention have been explained and illustrated in the full preferred embodiments. However, it must be understood that this invention may be practiced otherwise than is specifically explained and illustrated without departing from its spirit and scope.

What is claimed is:

1. An apparatus for generating an output signal indicative of an angular position of a rotating member, comprising:
   a target wheel having a plurality of teeth separated by slots angularly spaced around a periphery thereof, said target wheel being configured to be mounted to the rotating member for rotation therewith;
   a sense assembly having a biasing magnet and magneto-resistive (MR) magnetic field sensor disposed between said magnet and said target wheel; and
   a control circuit coupled to said MR sensor configured to generate said output signal having transitions between first and second states at the passage thereby of each leading and trailing edge of said teeth, said control circuit further including an arrangement for electrically biasing said MR sensor to produce an input signal having a direct-current component and an alternating current component superimposed thereon when said target wheel rotates, wherein said control circuit further includes a first amplifier circuit having a fixed DC offset configured to remove a fixed portion of said DC component from said input signal to generate a first signal, said control circuit further including a peak detector circuit responsive to said firs signal for generating a second signal representative of a maximum voltage level of said first signal, said control circuit further including a second amplifier circuit responsive to said first signal having an adaptive DC offset based on said second signal configured to remove a remaining portion of said DC component from said first signal.

2. The apparatus of claim 1 wherein said second amplifier circuit is configured to generate a third signal having said DC component substantially removed.

3. The apparatus of claim 2 wherein said control circuit further includes:
   a threshold reference generator for producing a threshold signal that is a percentage of a peak level of said third signal; and
   a comparator configured to generate said output signal in response to said third signal and said threshold signal.

4. The apparatus of claim 1 wherein said MR sensor is a first MR sensor, said sense assembly further including:
   a second magneto-resistive sensor arranged in series with said first MR sensor to form a voltage divider having a common node on which said input signal is generated; and a power supply connected across said voltage divider;

wherein said second MR sensor is disposed on said magnet so as to remain uninfluenced by rotation of said target wheel.

5. A method for generating an output signal indicative of an angular position of a rotating target wheel having a plurality of teeth separated by slots angularly spaced around a periphery thereof, comprising the steps of:

(A) producing an input signal by biasing a magneto-resistive magnetic field sensor disposed between a magnet and the rotating target wheel;

(B) reducing a DC component of the input signal by a fixed amount;

(C) amplifying an AC component of the input signal to maximize the AC component within a dynamic range of a control circuit, the reduced DC component and amplified AC component input signal defining a first signal;

(D) removing a remaining portion of said DC component using an adaptive DC offset determined based on a peak level of the first signal to produce a second signal; and (E) generating the output signal having transitions between first and second states at the passage thereby of each leading and trailing edge of said teeth in accordance with said second signal.

6. The method of claim 5 wherein said generating step includes the substep of:

detecting a peak level of the first signal and outputting a second signal in response thereto.

7. The method of claim 6 wherein said generating step further includes the substep of:

removing a remainder of the DC component of the input signal using said second signal, and outputting a third signal in response thereto.

8. The method of claim 7 wherein said generating step further includes the substeps of:

producing a threshold signal that is a percentage of a peak level of the third signal; and producing the output signal in one of the first and second states when the third signal exceeds the threshold signal.

* * * * *